Nov. 9, 1971  W. M. POSINGIES  3,618,398
FLUID VORTEX DEVICE
Filed Jan. 7, 1970

INVENTOR.
WALTER M. POSINGIES
BY
ATTORNEY 3,618,398
FLUID VORTEX DEVICE
Walter M. Posingies, Edina, Minn., assignor to
Honeywell Inc., Minneapolis, Minn.
Filed Jan. 7, 1970, Ser. No. 1,106
Int. Cl. G01p *3/26*
U.S. Cl. 73—505                                 9 Claims

ABSTRACT OF THE DISCLOSURE

Fluid vortex apparatus comprising a housing enclosing a vortex chamber, a primary coupling element surrounding the vortex chamber, a central fluid outlet from the vortex chamber, and secondary coupling means located within the vortex chamber between the primary coupling element and the central outlet. The primary coupling element is structured to introduce fluid into the vortex chamber so that it has substantially no rotational velocity with respect to the chamber housing, fluid within the vortex chamber acquiring a rotational velocity with respect to the housing in response to input stimulii. The secondary coupling means modifies any rotational flow pattern within the vortex chamber so as to produce a characterized time-varying rotational flow pattern in the fluid outlet. A sensor in the outlet produces a signal indicative of the rotational velocity of flow about the axis of the outlet, thereby resulting in a characterized response to the input stimulii.

BACKGROUND OF THE INVENTION

This invention pertains to fluid vortex apparatus, and more particularly, to coupling means for integrating vortex rate sensing instruments.

A vortex rate sensor is a fluidic device which is sensitive to changes in angular velocity (rate of turn) about an axis. It contains no essential moving structural parts. Change in angular velocity of a vortex rate sensor about its sensitive axis results in a modification of a fluid flow pattern therewithin which is then sensed to provide a rate signal.

Structurally, a vortex rate sensor generally comprises housing means enclosing a chamber having a central axis and a fluid outlet from the chamber extending along the axis. Fluid permeable coupling means is provided at the periphery of the chamber for introducing fluid thereinto so that it has no rotational velocity about the axis relative to the housing. A flow sensor is associated with the fluid outlet. The flow sensor provides a signal indicative of rotational velocity of fluid in the outlet relative to the housing.

In operation, a fluid source provides fluid flow into the vortex chamber through the coupling means. In the absence of a rate input to the sensor, fluid flow through the vortex chamber approximates two dimensional pure sink flow. Such fluid flow has no angular velocity about the sensor axis relative to the sensor housing. When the sensor is subjected to a rate input about its sensitive axis, the coupling element functions to produce the same angular velocity in the fluid flowing therethrough. Since there is relatively little coupling in conventional sensors between the housing and the fluid within the vortex chamber, the fluid takes on an angular velocity relative to the housing after leaving the coupling means. The angular velocity is superimposed on the radial velocity and a spiral fluid flow field is produced. Due to the principle of conservation of angular momentum, the rotational flow velocity increases as the fluid approaches the central outlet.

A flow sensor or signal pickoff associated with the fluid outlet produces a signal indicative of the rotational velocity of fluid flowing therethrough. Since the rotational velocity of fluid flowing through the outlet varies with rate input to the vortex rate sensor about its sensitive axis, the signal from the pickoff also varies with the rate input.

Rate signals are required in all aircraft flight control systems, as well as in many other applications. Due to the inherent simplicity and potential for ruggedness, reliability and low cost of fluidic devices, vortex rate sensors have found frequent application in control systems, particularly where extreme environments are encountered. Control systems requiring a rate signal frequently require a signal indicative of some predetermined characterized function of pure rate. For example, certain aircraft flight control systems have been found to require a signal indicative of rate plus lagged rate about an axis. In many cases, the desired predetermined function of rate cannot be produced by a conventional prior art vortex rate sensor alone for the following reasons.

In a prior art vortex rate sensor, assuming that there is no coupling between the sensor housing and the fluid within the vortex chamber after it leaves the coupling means, amplification of the angular velocity of the fluid is substantially only dependent on the difference in diameters of the coupling means and the fluid outlet. Consequently, a vortex device can be said to have a gain which is dependent on the difference in these diameters.

Another characteristic of a vortex device is its time response. Since fluid entering the vortex chamber from the coupling means and any fluid in the vortex chamber require finite times to pass from the chamber to the signal pickoff, the effect of a rate input will not be immediately apparent at the pickoff. Further, the full effect of a rate input will not be apparent at the pickoff until time sufficient for the fluid entering the vortex chamber from the coupling means to reach the pickoff has elapsed. Thus, the time response of a vortex device is dependent on the transit time required for fluid to pass from the coupling means to the signal pickoff. The transit time is basically dependent on the diameter of the coupling means and the radial velocity at which fluid enters the chamber. The radial velocity is dependent on the pressure differential across the device and the impedance to fluid flow offered by the coupling means, assuming all of the other flow impedances to be negligible.

Accordingly, every vortex device has associated therewith a signal transfer characteristic, including a gain factor and a time response factor, which is basically dependent on the device configuration. It will also be noted that both the gain and the time response are basically dependent on the geometry (particularly the diameter) of the vortex chamber. Since the gain and time response of a given prior art device cannot be varied independently, the latitude in varying the transfer characteristic of such a device is limited.

One prior art solution to the problem of generating signals indicative of a particular rate function, such as angular rate plus lagged angular rate, has been to process the pure rate signal, such as can be generated by a prior art vortex rate sensor, by means of a signal shaping network. However, this approach is undesirable since it requires the use of a signal shaping network in addition to a basic rate sensor. Accordingly, the advantages of a vortex rate sensor having the capability to produce any one of a wide range of rate functions is readily apparent.

SUMMARY OF THE INVENTION

The applicant's invention is a vortex device capable of sensing angular rate and producing a signal indicative of any one of a wide range of functions of that angular rate. Apparatus according to the applicant's invention comprises a housing enclosing a vortex chamber having a central axis and a fluid outlet from the vortex chamber. Primary fluid permeable coupling means is provided for introducing fluid into the vortex chamber so that it has substantially no rotational velocity relative to the housing. Secondary fluid permeable coupling means is fixed to the housing within the vortex chamber for modifying the fluid flow pattern therewithin. The secondary coupling means may comprise one or more annular coupling elements concentric about the central axis. Each of the secondary coupling elements provides only incomplete coupling between the fluid in the vortex chamber and the chamber housing. Different ones of the secondary coupling elements may be structured to provide different degrees of coupling. Sensing means is also provided for producing a signal indicative of the net rotational velocity of fluid in the outlet relative to the housing.

DESCRIPTION OF THE PREFERRED EMBODIMENT

Figure 1:
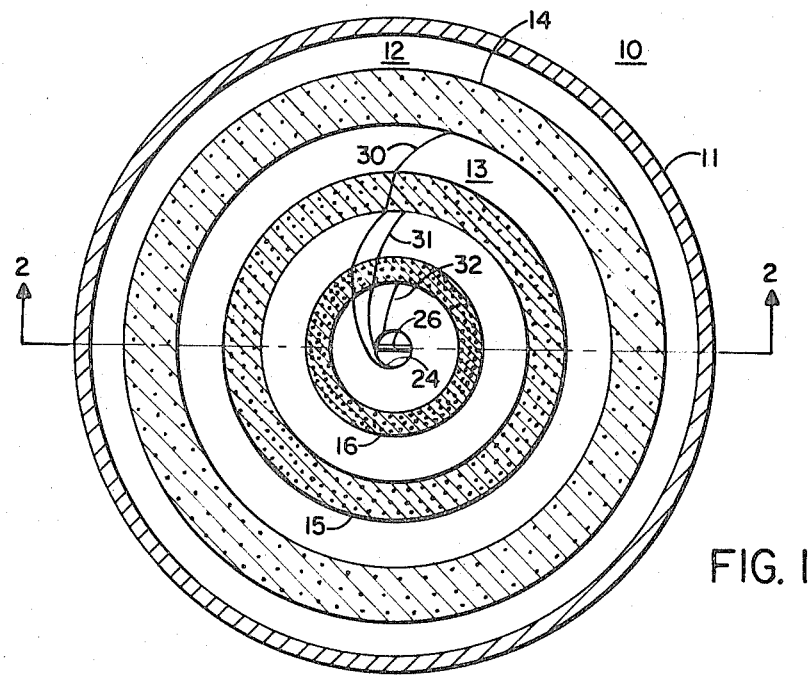
FIG. 1 is a sectional plan view taken along lines 1—1 in FIG. 2 of a vortex device in accordance with the applicant's invention.
Figure 2:
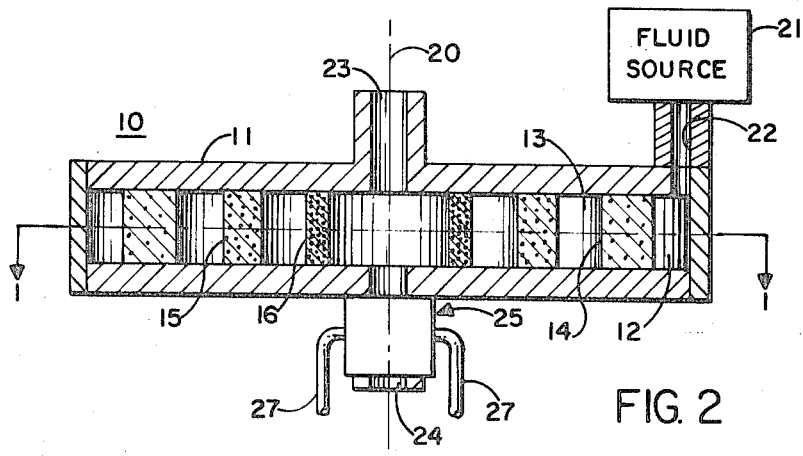
FIG. 2 is a sectional view of the embodiment of the applicant's invention shown in FIG. 1 taken along lines 2—2.

In FIGS. 1 and 2, reference numeral 10 generally identifies vortex rate sensing apparatus in accordance with the applicant's invention. Sensor 10 comprises a housing 11 enclosing a supply plenum 12 and a vortex chamber 13. Supply plenum 12 and vortex chamber 13 are separated by a primary fluid permeable coupling element 14 which will hereinafter be described in greater detail. Secondary coupling means including secondary coupling elements 15 and 16, which will also hereinafter be described in greater detail, are fixed to housing 11 within chamber 13. Vortex chamber 13 is shown symmetrical about a central axis 20, and is shown as having a circular cross section perpendicular to axis 20.

Plenum 12 is supplied with fluid from a source 21 through an inlet passage 22. Vortex chamber 13 is shown provided with a pair of fluid outlets 23 and 24 extending along axis 20. A signal pickoff 25 is associated with outlets 23 and 24. Signal pickoff 25 senses the flow pattern within outlet 24 and produces a signal indicative of the rotational component of flow about axis 20 relative to housing 11.

Signal pickoff 25 may be any one of a number of well known types of pickoffs utilized with vortex devices. The pickoff illustrated comprises a blade member 26 extending at least partially across outlet 24 and oriented so that a chord thereof is aligned with axis 20. A plurality of pressure ports (not shown) are associated with blade member 26, and are connected to any suitable utilization apparatus through conduits 27. Pressure signals indicative of the angle of attack of fluid on blade member 26, and hence indicative of the rotational velocity of fluid in passage 24, are produced in conduits 27. Thus, the pressures in conduits 27 are indicative of rate input to sensor 10.

Primary coupling element 14 and secondary elements 15 and 16 are formed of porous fluid permeable materials. Examples of such fluid permeable materials are sintered metals and ceramics and formations of small glass balls. Primary coupling element 14 is sufficiently permeable to permit the flow of fluid therethrough. It is also structured such that fluid flowing therethrough emerges with no net velocity parallel to the inner coupling element surface. Accordingly, primary coupling element 14 provides close coupling between the fluid flowing therethrough and the structure of sensor 10.

Secondary coupling elements 15 and 16 are also sufficiently permeable to permit the flow of fluid therethrough. However, the secondary coupling elements 15 and 16 are structured to provide incomplete coupling between the fluid flowing therethrough and the structure of sensor 10. Accordingly, fluid entering the outer surface of these coupling elements with a component of velocity parallel to the surface emerges from the inner surface with a corresponding component of velocity. However, the tangential velocity components of the entering and emerging fluid may not be of the same magnitude. The coupling effectivity of either of these coupling elements may be varied by varying the porosity and/or thickness of the material from which it is formed. The material from which coupling element 16 is formed is indicated as more porous than the material from which coupling element 15 is formed. Coupling element 16 is also shown thinner than coupling element 15. Consequently, coupling element 16 provides less complete coupling.

In operation, a pressure differential exists between supply passage 22 and fluid outlets 23 and 24. Thus, fluid flows through primary coupling element 14 and vortex chamber 13 to outlets 23 and 24. In the absence of any change in angular velocity of sensor 10 about axis 20, fluid flow through vortex chamber 13 is substantially entirely radial since fluid emerging from the inner surface of coupling element 14 has no net tangential velocity. If the angular velocity of sensor 10 about axis 20 is varied, a rotational component of flow relative to housing 11 is impressed on the fluid flowing through chamber 13. Under such conditions, fluid flowing through chamber 13 has superimposed radial and rotational components. In the absence of other flow modifying devices such as secondary coupling elements 15 and 16, the fluid within chamber 13 follows spiral flow paths from primary coupling element 14 to fluid outlets 23 and 24. As a result of the requirement for conservation of angular momentum, the rotational flow velocity then increases as the fluid approached the outlets. Specifically, the rotational flow velocity varies inversely with distance from the outlet.

However, secondary coupling elements 15 and 16 have the effect of modifying any rotational component of the flow pattern within chamber 13. For example, assume that sensor 10 has been in operation under steady state conditions (i.e., conditions of no angular acceleration about axis 20) for a period of time sufficient to establish an entirely radial flow pattern within vortex chamber 13. Then, assume a constant angular acceleration input to sensor 10 about axis 20. Under such conditions, as fluid emerges from primary coupling element 14, it acquires a velocity component parallel to the inner surface of the coupling element. The magnitude of this velocity component is dependent on the magnitude of the acceleration input and the radius of the inner coupling element surface. As the fluid proceeds toward outlets 23 and 24, its angular velocity with respect to housing 11 increases in accordance with principles of conservation of angular momentum. However, this fluid subsequently enters secondary coupling element 15 whose angular velocity is identical to the angular velocity of housing 11. Due to amplification of the angular velocity component, the angular velocity of the fluid at the outer surface of coupling element 15 is generally different from the angular velocity of the coupling element. Thus, the angular velocity of the fluid relative to housing 11 generally changes as it passes through the coupling element. However, since the coupling provided by coupling element 15 is not complete, the fluid retains a portion of its angular velocity relative to the housing as it emerges from the coupling element. Again, the rotational velocity of this fluid relative to housing 11 is amplified as it proceeds toward outlets 23 and 24. Then as the fluid enters secondary coupling element 16, its angular velocity relative to housing 11 is again modified. However, secondary coupling element 16 is shown as providing only slight coupling between the fluid flowing therethrough and housing 11. Accordingly, it only slightly modifies the flow pattern within chamber 13. Under the above conditions, flow from primary coupling element 14 follows a path similar to that identified by reference numeral 30.

Reference numeral 31 identifies a flow path typical of that which is followed by fluid leaving secondary coupling element 15 at the instant sensor 10 is subjected to an angular acceleration input. Since this fluid has no initial component of velocity parallel to the inner surface of coupling element 15, it has less angular velocity relative to housing 11 throughout its travel between coupling elements 15 and 16. The fluid following flow path 31 is subject to the same influences as fluid following flow path 30. However, since the fluid following flow path 31 has a smaller initial component of angular velocity than does the fluid following flow path 30, this difference continues throughout its travel.

Reference numeral 32 identifies a fluid flow path followed by fluid leaving secondary coupling element 16 at the instant sensor 10 is subjected to an angular acceleration. Again, since this fluid has no initial component of velocity parallel to the inner surface of element 16, its angular velocity with respect to housing 11 is smaller than the angular velocities of fluid following paths 30 and 31 in the region between element 16 and outlets 23 and 24.

To further illustrate the operation of sensor 10, consider the output signal produced by signal pickoff 25 in response to a step rate input. The effect of this rate input on the fluid within coupling element 16 will be apparent at pickoff 25 first in time. Specifically, the signal produced by pickoff 25 will, within a short time, rise to a level corresponding to the product of the magnitude of the rate input and the amplification provided by the portion of vortex chamber 13 within coupling element 16. As previously described, the amplification provided by this portion of chamber 13 is basically determined by the difference in diameters of element 16 and outlet passages 23 and 24. The time required for the output signal to rise to this value is determined by the difference in diameters of the coupling element and the outlet passages and the flow velocity within this portion of the chamber.

The effect of the rate input on the fluid between coupling elements 15 and 16 will appear at pickoff 25 next in time. Due to the larger diameter of coupling element 15, the angular velocity of fluid between elements 15 and 16 will be subject to greater amplification. As this fluid passes through element 16, its angular velocity is modified. Even with this modification, the fluid leaves coupling element 16 with a significant component of angular velocity. Thus, when this fluid reaches pickoff 25, the output signal is further increased. Similarly, when the fluid leaving coupling element 14 at the time of the rate input reaches pickoff 25, the output signal is even further increased. Accordingly, the output signal produced by pickoff 25 in response to a step rate input has the characteristic of reaching a predetermined portion of its maximum level within a relatively short period of time. Thereafter, the output signal gradually increases to its maximum level.

Sensor 10 can be visualized as comprising a series of three hypothetical conventional vortex devices, each device except the last connected to supply its output signal to the fluid inlet of the next succeeding device, and each device except the first connected to receive its incoming fluid from the next preceding device. Since secondary coupling elements 15 and 16, which function as fluid inlet coupling elements for the two inner devices, provide incomplete coupling, fluid entering the two inner devices generally has some initial component of rotational velocity depending on the output of the next preceding device. Each of these hypothetical devices has its own associated signal transfer characteristic including a gain factor and a time response factor. The gains associated with the individual hypothetical devices increases as the diameters of the devices increases. In addition, the time lags provided by the individual hypothetical devices increase as the device diameters increase. Accordingly, the transfer characteristic of an actual vortex rate sensor can be tailored by combining various hypothetical devices as required, and by providing the various secondary coupling elements with the proper degrees of coupling effectivity.

The applicant has discovered that the different effects produced by different portions of sensor 10 as a result of a rate input are integrated or summed at signal pickoff 25 so that the signal produced thereby is indicative of a summation of the modifications to the flow paths produced by the various coupling elements. Thus, the signal produced by pickoff 25 is indicative of the composite effects produced by the various coupling elements on the fluid flowing therethrough, and is indicative of a particular function of the rate input imposed on sensor 10.

It is pointed out that the described operation of a series of vortex devices, the composite output of which is supplied to a common pickoff, can effectively be provided by structural embodiments other than the one specifically illustrated. For example, rather than providing a plurality of discrete coupling elements, it may be found advantageous to utilize a continuous coupling element wherein the degree of coupling effectivity is varied with distance from the central axis of the sensor. Also, viscous coupling can be employed. This can be accomplished by constructing the sensor so that vortex chamber 13 is very thin, thereby subjecting a substantial portion of the fluid within the chamber to boundary layer effects. Alternately, viscous coupling can be accomplished by providing a plurality of closely spaced members, thereby producing the plurality of very thin passages through which the fluid must flow.

In accordance with the foregoing description, it can be seen that the applicant has disclosed simple fluidic means for sensing angular rate about an axis and providing a signal indicative of a predetermined function of this angular rate. Further, this method has inherent versatility since the particular function can be varied as desired over a wide range by providing appropriate series operating coupling means. Although one specific embodiment is shown in detail, this embodiment is only exemplary. A wide variety of other structural embodiments in accordance with applicant's contemplation and teaching will be apparent to those skilled in the art.

What is claimed is:
1. Fluid vortex apparatus comprising:
   housing means defining a plenum chamber having a fluid inlet, a vortex chamber having a central axis, and a fluid outlet from the vortex chamber extending along the axis;
   primary coupling means permeable to fluids separating the plenum chamber from the vortex chamber, fluid flowing through said primary coupling means acquiring substantially the same rotational velocity about the central axis as said housing, fluid in the vortex chamber acquiring a rotational velocity relative to said housing in response to changes in the rotation of said housing about the axis;
   secondary annular fluid coupling means within the vortex chamber surrounding the axis for further modifying fluid flow in the chamber in response to changes in the rotational velocity of said housing means about the axis, said secondary coupling means providing incomplete coupling between said housing means and the fluid within the vortex chamber; and
   sensing means operable to produce a signal indicative of the rotational velocity of the fluid in the outlet about the axis, the rotational velocity of the fluid in the outlet being indicative of the rotational velocity acquired by the fluid while in the vortex chamber.

2. The vortex apparatus of claim 1 wherein said secondary annular fluid coupling means comprises a plurality of concentric coupling elements.

3. The vortex apparatus of claim 2 wherein different coupling elements of said plurality of coupling elements have different permeabilities to fluid flow therethrough, whereby different coupling elements provide different degrees of coupling between said housing means and the fluid within the vortex chamber.

4. In a vortex device:
a housing enclosing a cavity having a central axis;
outlet means for discharging fluid from the cavity along the axis;
a primary fluid permeable coupling member separating said cavity into a vortex chamber in communication with said outlet means, and a plenum chamber;
inlet means for admitting fluid into the plenum chamber, said coupling member providing substantially complete coupling between said housing and the fluid flowing through said primary coupling member so that the fluid entering the vortex chamber has substantially the same rotational velocity about the central axis as said housing, fluid in the vortex chamber acquiring a rotational velocity relative to said housing in response to changes in the rotational velocity of said housing about the axis;
secondary fluid permeable coupling means within the vortex chamber for further modifying fluid flow therein in response to changes in the rotational velocity of said housing about the axis, said secondary annular coupling means providing incomplete coupling between said housing and the fluid within the vortex chamber; and
sensing means operable to produce a signal indicative of the rotational velocity of the fluid in the outlet about the central axis, the rotational velocity of the fluid in the outlet being indicative of a summation of the modifications to the flow of fluid through the vortex chamber.

5. The vortex device of claim 4 wherein said secondary fluid permeable coupling means comprises a plurality of concentric fluid permeable coupling elements.

6. The vortex device of claim 5 wherein different ones of said plurality of coupling elements have different permeabilities to fluid flow therethrough, whereby different ones of said plurality of coupling elements provide different degrees of coupling between said housing and the fluid within the vortex chamber.

7. In fluid vortex apparatus including a housing defining a fluid inlet, a vortex chamber having a central axis, a fluid outlet from the vortex chamber spaced from the fluid inlet, and sensing means operable to produce a signal indicative of the rotational velocity of the fluid in the vortex chamber about the axis, the improvement which comprises:
primary fluid permeable coupling means fixed to said housing separating the fluid inlet from the vortex chamber, fluid flowing through said primary coupling means acquiring substantially the same rotational velocity about the central axis of said housing; and
secondary fluid permeable coupling means within the vortex chamber for further modifying fluid flow therethrough in response to changes in the rotational velocity of said housing about the central axis, said secondary coupling means providing incomplete coupling between said housing and the fluid within the vortex chamber.

8. The vortex apparatus of claim 7 wherein said secondary coupling means comprises a plurality of concentric fluid permeable coupling elements.

9. The vortex apparatus of claim 8 wherein different ones of said plurality of coupling elements have different permeabilities to fluid flow therethorugh, whereby different ones of said plurality of coupling elements provide different degrees of coupling between said housing and the fluid within the vortex chamber.

References Cited

UNITED STATES PATENTS

| 3,276,259 | 10/1966 | Bowles et al. | 73—194 |
| 3,320,815 | 5/1967 | Bowles | 73—505 |

JAMES J. GILL, Primary Examiner

U.S. Cl. X.R.

137—81.5